(12) United States Patent
Clements et al.

(10) Patent No.: US 6,519,565 B1
(45) Date of Patent: *Feb. 11, 2003

(54) METHOD OF COMPARING UTTERANCES FOR SECURITY CONTROL

(75) Inventors: Bradley Alan Clements, Kent, WA (US); Sherrie Adcock, Dana Point, CA (US); Gerald S. Schwartz, Kirkland, WA (US)

(73) Assignee: Voice Security Systems, Inc., Dana Point, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/710,590

(22) Filed: Nov. 10, 2000

Related U.S. Application Data

(63) Continuation-in-part of application No. 09/190,386, filed on Nov. 10, 1998, now Pat. No. 6,161,094.

(51) Int. Cl.[7] .............................................. G10L 17/00
(52) U.S. Cl. ..................... 704/273; 704/274; 704/275; 704/254
(58) Field of Search ................................. 704/251, 254, 704/273, 274, 275

(56) References Cited

U.S. PATENT DOCUMENTS

| | | | |
|---|---|---|---|
| 3,673,331 A | | 6/1972 | Hair et al. |
| 3,896,266 A | | 7/1975 | Waterbury |
| 4,449,189 A | | 5/1984 | Feix et al. |
| 4,833,713 A | | 5/1989 | Muroi et al. |
| 5,054,083 A | * | 10/1991 | Naik et al. .................. 381/42 |
| 5,313,556 A | | 5/1994 | Parra |
| 5,613,012 A | * | 3/1997 | Hoffman et al. ............ 382/115 |
| 5,805,674 A | * | 9/1998 | Anderson, Jr. ........... 379/93.03 |
| 5,835,894 A | * | 11/1998 | Adcock et al. ............. 704/273 |
| 5,838,812 A | * | 11/1998 | Pare, Jr. et al. ............. 382/115 |
| 6,161,094 A | * | 12/2000 | Adcock et al. ............. 704/273 |

* cited by examiner

Primary Examiner—Susan McFadden
(74) Attorney, Agent, or Firm—Gene Scott-Patent Law & Venture Group

(57) ABSTRACT

A security method compares a present verbal utterance with a previously recorded verbal utterance by comparing time-frequency domain representations of the utterances, with multiple repeat utterances forming a basis for determining a variation in repetitious performance by an individual, and similar differences between enrollment and challenge utterances forming a basis for a similar analysis of variance between enrollment and challenge utterances. In one embodiment a set of enrollment data is searched by each challenge until either a match is made, indicating an action, possibly dependent upon the specific match, or no match is made indicating an abort. In one application an individual is accepted or rejected as an imposter, in another applicaton, a selected action is accepted as corresponding to a verbal command.

6 Claims, 1 Drawing Sheet

METHOD OF COMPARING UTTERANCES FOR SECURITY CONTROL

This application is a continuation-in-part of a previously filed application, Ser. No. 09/190,386 filed Nov. 10, 1998 now U.S. Pat. No. 6,161,094 and which is at the time of filing of this application.

BACKGROUND OF THE INVENTION

1. Field of the Invention

This invention relates generally to electronic security methods which provide for modeling or otherwise comparing human features such as fingerprints, voice patterns, and retina patterns, in order to distinguish between individuals, and, more particularly, to a security method and protocol for modeling and comparing voice utterances to control the operation of a security device.

2. Description of Related Art

The following art defines the present state of this field:

Parra, U.S. Pat. No. 5,313,556 describes the identity of an individual (known or unknown) that is determined by a sonic profile of sounds issued through his oral-nasal passages. The sounds are converted to digital electrical signals and produce a three domain format of frequency, amplitude and time samples to produce an array of peaks and valleys constituting the sonic profile of an individual. A source or library of sonic profiles in the same format of a known individual have a interrelationship including relative positions of said peaks and valleys of said sonic profile of the known individual with that of said unknown individual compared and a utilization signal is provided upon detecting or non-detecting a correlation between said sonic profiles.

Hair et al., U.S. Pat. No. 3,673,331 describes voice verification that is accomplished at a plurality of spaced apart facilities each having a plurality of terminals. Multiplexing structure interconnects the terminals through a communications link to a central processing station. Analog reproductions of voices transmitted from the terminals are converted into digital signals. The digital signals are transformed into the frequency domain at the central processing station. Predetermined features of the transformed signals are compared with stored predetermined features of each voice to be verified. A verify or non-verify signal is then transmitted to the particular terminal in response to the comparison of the predetermined features.

Waterbury, U.S. Pat. No. 3,896,266 describes a security card (which may be a credit card) according to the invention has recorded on it data identifying a personal and non-counterfeitable attribute, such as the voice characteristics, of the authorized holder of the card. A card utilization system according to the invention provides means for comparing the attribute as recorded by these data with the corresponding attribute of the person wishing to use the card, thereby substantially eliminating the possibility of unauthorized card utilization.

Muroi et al., U.S. Pat. No. 4,833,713 describes a voice or sound recognition system including a microphone for converting a voice into an electrical voice signal, a frequency analyzer for generating a voice pattern in the form of a time-frequency distribution, and a matching unit for matching the voice pattern with registered voice patterns.

Feix et al., U.S. Pat. No. 4,449,189 describes a method and an apparatus for identifying an individual through a combination of both speech and face recognition. The voice signature of an interrogated person uttering a key word into a microphone is compared in a pattern matcher with the previously stored voice signature of a known person uttering the same key word to obtain a first similarity score. At the same time, when a key event in the utterance of the key word by the interrogated person occurs, a momentary image of that person's mouth region onto which a grid pattern has been projected is optically recorded and compared with the previously stored corresponding momentary image of the same known person to obtain a second similarity score.

The prior art teaches the comparing of voice signatures in time as well as frequency domain. However, the prior art does not teach a means for filtering such voice profiles by difference techniques. The present invention method fulfills these needs and provides further related advantages as described in the following summary.

SUMMARY OF THE INVENTION

The present invention teaches certain benefits in methods which give rise to the objectives described below.

The present invention is a security method which compares a present verbal utterance with a previously recorded (enrollment) verbal utterance by comparing frequency domain representations of the present utterance, with previously recorded multiply repeated utterances of the same material, forming a basis for comparison. Instead of comparing the utterances in the time domain, as is conventional, the present method approaches the comparison by establishing energy content in a variety of cells across the frequency domain, and instead of focusing on the ability of an individual to repeat an utterance from one trial to the next, sometimes separated by days, weeks or even longer, the present approach focuses on the variability of the difference between multiple utterances of the same words or phrases. Specifically, the method attempts to determine if two sounds were produced by the same human voice in an attempt to discriminate between allowed and non-allowed personnel seeking to operate a secure device such as an access lock. Further, the method may be used to determine what command is being given by the individual, culling out the selected command from a library of such commands all uttered by the same individual.

The present method invention has as an important aspect, the discrimination between, and, or matching of a presently uttered verbal word or phrase with the same utterance stored in a library of such utterances. Another aspect of the present method is the achievement of high accuracy and fast results in discrimination and, or matching of verbal utterances by using a difference method for comparison. The present method is a non-obvious and highly effective procedure for extremely high speed comparison of large data sets against a challenge so as to provide the convenience, for instance, of verbal only challenges at a secure door used by a large number of individuals with separate verbal access codes, wherein the delay time for approval has been shown to be in the range of a few seconds or less. The method also results in an extraordinary level of discrimination between individuals while providing a high level of "forgiveness" for the normal changes and variations in tone, timber and volume of the human voice from time to time. The discrimination capability of the present method provides a high enough level of confidence for use in military as well as industrial applications, and is inexpensive and simple to use so as to find application in residential use, commercial use and in consumer electronic devices and toys. A further aspect of the present method is the use of testing for minimum energy levels in a set of frequency ranges in the frequency domain, as well as testing for corresponding energy levels that surpass a selected energy level criterion. Other features and advantages of the present invention will become apparent from the following more detailed description providing an understanding of the principles of the invention.

DETAILED DESCRIPTION OF THE INVENTION

Figure 1:
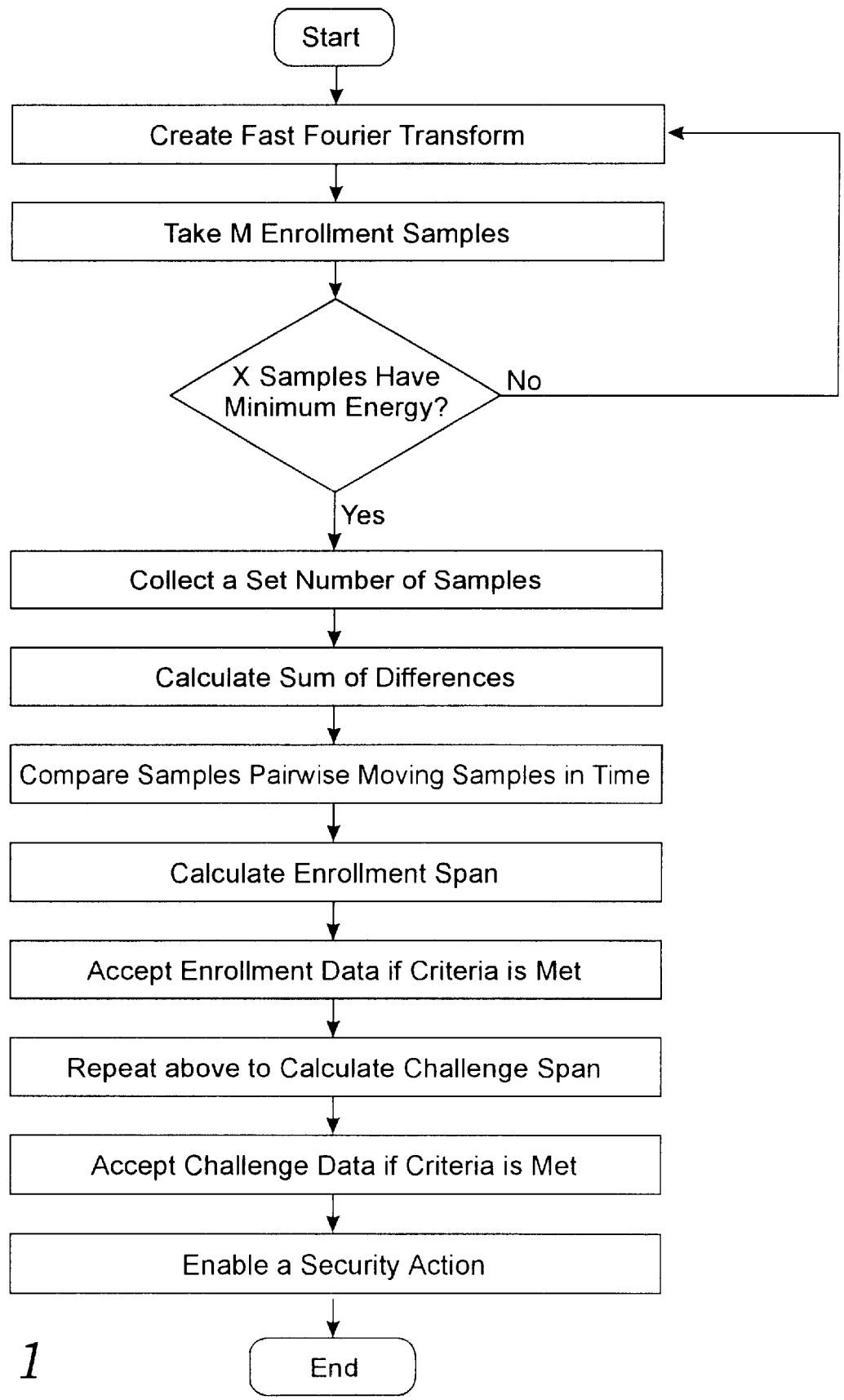
FIG. 1 is a block diagram defining the process of the present invention.

The present invention provides a step-by-step method for comparing a verbal utterance of a speaker in the present (challenge utterance), with a previously recorded verbal utterance (enrollment utterance), to determine the validity of the speaker, i.e., if the challenge utterance is being produced by the same person as was the enrollment utterance. When validity is determined, an action is authorized, such as opening a lock, dialing a secret phone number, granting access to data or services, etc. The method comprises certain steps which are performed in sequence. In summary the steps are defined by, first, preparing an enrollment data from an utterance from one or more persons, next, challenging the enrollment data with a present utterance from one of those persons, and finally enabling the security action if the challenge utterance is accepted as being close enough to one of the enrollment data. In this situation, the challenger identifies him/herself so that the comparison is only between the challenge utterance and the enrolled utterance of the same person; assuming it is the same person challenging. In an alternate use of the present method, a set of different utterances by the same person may be stored as enrollments for each of several words or phrases. The challenge in this situation comes when the challenger speaks one of the enrolled utterances and it is then the objective to match the challenge utterance with the correct enrollment word or phrase.

Preparing the enrollment data comprises the steps of, converting a verbal utterance, which we shall refer to an enrollment utterance, into an electrical signal as by a microphone or other transducer. This analog electrical signal is transformed into a digital format as is well known in the art, by, for instance, an analog to digital conversion circuit. Fast Fourier transformations for segments of this electrical signal are conducted to produce many frequency domain models of the enrollment utterance. The frequency domain models of the electrical signal segments are processed in frames of time corresponding to the average pitch period of the human voice, e.g. ~20 ms of data for each frame. Frames containing little or no energy are ignored. A selected number of these models, represented by the variable M are produced, each containing vector data points of N frequency channels in order to form an M by N sample enrollment matrix Ei.

M and N are selected as integers of a magnitude necessary for a level of security desired by the user, with larger numbers providing a higher level of confidence in the result. The matrix provides cell values Mi-Ni, where i represents an integer, which are characterized by a total energy content within each cell, i.e., a number. Next, the method provides for determining if at least X, an arbitrary number, of the M samples have a selected minimum energy content in at least Y, another arbitrary number, of the N frequency channels. If not, the enrollment utterance is repeated until the criteria X and Y are satisfied, or if not, after several tries, the process of enrollment is aborted. This usually would only happen if the speaker is not able to provide enough volume in his or her speech to enable production of the minimum energy criterion or if the input is not a human voice so that a necessary spectral content is lacking.

When the enrollment is successful, the process is repeated until a selected number of the sample matrices, herein designated as Ei, have been formed and stored. We shall refer to these matrices as E1, E2, E3, and so on. Typically, we shall require at least three of these matrices in order to be satisfied with a successful enrollment of a voice utterance.

Next, the method requires forming the sum of the differences between pairs of the enrollment matrices Ei, to determine a difference EDi, relative to each other as $ED1=(E1-E2)+(E1-E3)$, $ED2=(E2-E1),(E2-E3)$, and son on. Algorithms are applied such that each individual frame is compared with each approximately corresponding frame in time, between the matrices and is allowed to slip a limited number of frames, forward or backward in time in order to obtain a best match. Thus, we have determined a variance or variability characteristic of the individual speaker in forming the enrollment utterances in relation to the other utterances captured.

Finally, the maximum enrollment span, ES, is calculated from the differences EDi between each of the matrices Ei, as $ES=(ED1-ED2)$ or $(ED2-ED3)$ or $(ED1-ED3)$, whichever is greatest and accept the enrollment data only if $ES<R1$, a selected first enrollment criterion called the "enrollment span," and also only if at least one or more of the differences EDi is less than R2, a selected second enrollment criterion called "enrollment base". The first part of this step is critical to the viability of the present method in that R1 determines that the total variance between the differences EDi, must be less than the R1 criterion or else we must consider that the variances in repetitive spoken utterances of the same material, for this individual, is too low to be useful in the present method. This assures us that a previously captured recording is not being used for enrollment, i.e., we can be sure that the differences in the matrices are at least as great as would be normally expected from a human voice. When the same recording is used for any two of the enrollment samples, we find that variability between them is less than is produced by the human voice. The second part of this step is also critical to the viability of the present method in that R2 is used to determine that the variances in repetitive spoken utterances of the same material, for this individual, is too great to be useful in the present method. This is clearly a novel step, with respect to the prior art and is critical to the determination of correlation between an utterance spoken at one point in time relative to the same utterance spoken at another point in time and it's relationship to the consistency of the individual to repeat that utterance. The EDi values are stored along with the enrollment sample matrices for later comparison to a challenge utterance. If the sample data is altered, the EDi reference values can be used to repudiate the enrollment data, invalidating the integrity of the data prior to comparison with a challenge utterance.

Challenging the enrollment data comprises the steps of, first, converting a challenge verbal utterance into an electrical signal as by a microphone or other transducer. This electrical signal is converted into a digital format as with the enrollment procedure. Fast Fourier transformations of portions of this electrical signal are conducted to produce many frequency domain representations of the challenge utterance. The frequency domain models, of the electrical signals are processed in frames of time corresponding to the average pitch period of the human voice, e.g. approx. 20 ms. of data for each frame. Frames containing little or no energy are ignored. A number of frames, represented again, by M, are accepted, each containing vector data points of N frequency channels in order to form an M by N sample of the challenge matrix C, and determining if at least X of the M samples have a selected minimum energy content in at least Y of the N frequency channels.

It is clear that these steps for obtaining the challenge matrix are identical to the corresponding steps in the enrollment procedure. These challenge steps are repeating if the later test for minimum energy fails, and the challenge is aborted after a selected number of such repeats on the basis that an impostor is trying to crack the system and such an impostor should not be given as many tries as he/she would need to manipulate the system without authorization.

Next the sum of the differences between C and Ei for each pair of the matrices Ei is calculated producing a difference CDi between C and each pair of enrollment matrices Ei as they relate to each other, as CD1=(C−E1)+(C−E2), D2=(C−E2)_(C−E3), and so on. Algorithms are applied such that each individual frame is compared with each corresponding frame in time with the other matrix and is allowed to slip a limited number of frames, forward or backward in time in order to obtain a best match as was accomplished with the enrollment procedure. Well known dynamic time warping technologies are used for this step Finally, the maximum span, CS, of the maximum differences between values of CDi, as CS=[(D1−D2) or (D2−D3) or (D3−D1) . . . ] is formed. These steps correspond to similar steps in the enrollment process. C is accepted as a valid challenge if CS<V1, V1 being a selected first verification criterion and also if at least one said difference CDi between C and each of the pairs of CEi is less than V2, V2 being a selected second verification criterion. Both V1 and V2 play corresponding roles to R1 and R2 in the enrollment procedure and are used for the same reason. When these criteria are met the challenge verbal utterance is accepted and the requisite security step is enabled.

We have described the present method when used for an application where only one challenger is expected. In this case only one enrollment need be made. The objective in such a system is to assure that only the one enrolled individual can access the system by successfully challenging the method. All others, being impostors, must not be able to successfully challenge the method so that they are locked out of any security system using the method.

It is clear that such a system may use the method for a plurality of users at the same time when an enrollment is completed for each user. In this case, a challenge is made by any one of the users and the challenge method is then carried out for each of the enrollments until either a successful challenge is made or all of the enrollments have been tested without success.

It is clear, also, that the system may be used for a single user with a plurality of enrolled utterances making up a plurality of possible different actions depending upon the match. An example would be to use the system to open the lock on a door, then turn the room lights on, next turn on soft music, and finally to start a cooking device to prepare dinner. This could be accomplished by a single challenger uttering a series of verbal commands wherein each command is carried out by servomechanisms after it is matched with an enrolled corresponding utterence.

It is also clear that each of the data sets may include a definition of a specific action so that when a specific match is made between a challenge and an enrollment, the specific action may be carried out in deference to other actions corresponding to the other enrollments.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A method of comparing a challenge verbal utterance with several enrollment verbal utterances from the same individual to determine a security action, the method comprising the steps of:
  A) preparing an enrollment data comprising the steps of:
    a) creating a Fast Fourier transform of an electrical signal representation of a verbal enrollment utterance to produce an enrollment frequency domain representation thereof;
    b) taking M enrollment samples of the enrollment frequency domain representation for each of N frequency channels to form an M by N enrollment matrix E;
    c) determining if at least X of the M enrollment samples have a selected minimum energy content in at least Y of the N frequency channels;
    d) repeating steps (a) through (c) if the determination at step (c) is negative, and aborting after a selected number of negative repeats of steps (a) through (c);
    e) repeating steps (a) through (c) if the determination at step (c) is positive, until a selected number of said sample enrollment matrices Ei are formed as E1, E2, E3, . . . ;
    f) calculating the sums of the differences EDi between each Ei, as ED1=(E1−E2)+(E1−E3)+ . . . , ED2= (E2−E1)+(E2−E3)+ . . . ;
    g) comparing the enrollment samples pairwise by moving each sample forward and backward in time to obtain a best match;
    h) calculating an enrollment span, ES, equal to the difference between the largest and the smallest value of EDi; and
    i) accepting the enrollment data if:
      i. ES<R1, and
      ii. EDi<R2 exists, where R1 and R2 are selected enrollment criterion,
  B) challenging the enrollment data comprising the steps of:
    a) creating a Fast Fourier transform of an electrical signal representation of a verbal challenge utterance to produce a challenge frequency domain representation thereof;
    b) taking M challenge samples of the challenge frequency domain representation for each of N frequency channels to form an M by N challenge matrix C;
    c) determining if at least X of the M challenge samples have a selected minimum energy content in at least Y of the N frequency channels;
    d) repeating steps (a) through (c) if the determination at step (c) is negative, and aborting after a selected number of negative repeats of steps (a) through (c);
    e) calculating the sums of the difference CDi between C and each Ei, as CD1=(C−E1)+(C−E2), CD2=(C−E2)+(C−E3), CD3=(C−E3)+(C−E4), . . . ;
    f) comparing each one of the challenge samples pairwise by moving a the samples forward and backward in time to obtain a best match;
    g) calculating a challenge span, CS, equal to the difference between the largest and the smallest value of CDi; and h) accepting the challenge data only if:
   i. CS<V1, and
   ii. CDi<V2, exists, where V1 and V2 are selected verification criterion, C) enabling the security action if the challenge verbal utterance is accepted.

2. The method of claim 1 further comprising the plural repeating of steps (A) (a) through (A) (i) for selected individuals so as to create a plurality of individual enrollment data sets.

3. The method of claim 2 further comprising the step of pairwise comparing the plurality of individual enrollment data sets and rejecting each new one of said enrollment data sets if corresponding enrollment spans do not differ by a selected amount.

4. The method of claim 2 further comprising the step of pairwise comparing the plurality of individual enrollment data sets and rejecting each new one of said enrollment data sets if corresponding enrollment spans differ by more than a selected amount.

5. The method of claim 1 wherein each of the data sets includes data defining a specific security action wherein upon after a successful verification, a further step is taken to complete said specific security action, said action including the generating of an electrical signal.

6. The method of claim 1 further comprising the plural repeating of steps (A) (a) through (A) (i) for selected actions so as to create a plurality of action enrollment data sets.

* * * * *